(12) United States Patent
Falk-Petersen et al.

(10) Patent No.: US 11,912,408 B2
(45) Date of Patent: Feb. 27, 2024

(54) DEVICE FOR STORING AND REMOTELY LAUNCHING UNMANNED AERIAL VEHICLES

(71) Applicant: FLIR Unmanned Aerial Systems AS, Hvalstad (NO)

(72) Inventors: Erik Falk-Petersen, Oslo (NO); Martin Krafft, Hvalstad (NO); Jan Tronsdal, Hvalstad (NO)

(73) Assignee: FLIR Unmanned Aerial Systems AS, Hvalstad (NO)

( * ) Notice: Subject to any disclaimer, the term of this patent is extended or adjusted under 35 U.S.C. 154(b) by 487 days.

(21) Appl. No.: 17/110,271

(22) Filed: Dec. 2, 2020

(65) Prior Publication Data

US 2021/0253242 A1    Aug. 19, 2021

Related U.S. Application Data

(63) Continuation of application No. PCT/US2019/035676, filed on Jun. 5, 2019.

(51) Int. Cl.
*B64C 39/02* (2023.01)
*B60P 3/11* (2006.01)
*B64U 70/00* (2023.01)
*B64U 80/70* (2023.01)
*B64U 80/86* (2023.01)

(52) U.S. Cl.
CPC ............ *B64C 39/024* (2013.01); *B60P 3/11* (2013.01); *B64C 39/028* (2013.01); *B64U 70/00* (2023.01); *B64U 80/70* (2023.01); *B64U 80/86* (2023.01)

(58) Field of Classification Search
CPC ........ B64F 1/10; B64F 1/0299; B64C 39/024; B64C 39/028; B64C 39/02; B60P 3/11; B64U 70/00; B64U 80/70; B64U 80/86; B64U 10/00; G05D 1/0011; G05D 1/0022
See application file for complete search history.

(56) References Cited

U.S. PATENT DOCUMENTS

| | | | | |
|---|---|---|---|---|
| 4,236,686 A | * | 12/1980 | Barthelme | B64F 1/222 244/116 |
| 5,381,721 A | * | 1/1995 | Holmstrom | F41H 11/02 89/1.51 |
| 5,400,690 A | * | 3/1995 | Meili | F42B 5/15 89/1.816 |

(Continued)

FOREIGN PATENT DOCUMENTS

| WO | WO 03059735 | 7/2003 |
|---|---|---|
| WO | WO 2016059555 | 4/2016 |

*Primary Examiner* — Medhat Badawi
(74) *Attorney, Agent, or Firm* — Haynes and Boone, LLP

(57) ABSTRACT

In various embodiments, specialized vehicle launch systems and methods are provided to enable personnel to launch and operate one or more UAVs from the safety of a vehicle or other mobile location. In various embodiments, a launch system comprises a launch device and an operator terminal. The launch device is adapted to be mounted on an exterior surface of a vehicle and is communicably coupled to the operator terminal, which is operable from the interior of the vehicle. The vehicle launch system allows an operator to control one or more UAVs from inside the vehicle, without requiring the operator to step outside of the vehicle to interact with the UAV or launch device.

20 Claims, 17 Drawing Sheets

(56) References Cited

U.S. PATENT DOCUMENTS

| | | | | |
|---|---|---|---|---|
| 6,457,673 B1* | 10/2002 | Miller | B64F 1/06 | 244/63 |
| 6,626,399 B2* | 9/2003 | Young | A63H 27/14 | 446/65 |
| 7,089,843 B2* | 8/2006 | Miller | F41A 23/42 | 89/1.816 |
| 7,104,495 B2* | 9/2006 | McGeer | B64F 1/029 | 244/1 R |
| 7,140,575 B2* | 11/2006 | McGeer | B64F 1/04 | 244/63 |
| 7,143,976 B2* | 12/2006 | Snediker | B64C 25/68 | 244/110 G |
| 7,165,745 B2* | 1/2007 | McGeer | B64C 39/024 | 244/114 R |
| 7,210,654 B1* | 5/2007 | Cox | B64C 39/024 | 244/190 |
| 7,273,001 B2* | 9/2007 | Dekel | F42B 39/00 | 89/1.804 |
| 7,562,843 B2* | 7/2009 | Lipponen | F41B 3/02 | 124/56 |
| 7,665,691 B2* | 2/2010 | Hanzlick | B64F 1/10 | 244/63 |
| 8,162,256 B2* | 4/2012 | Goossen | B64F 1/04 | 244/114 R |
| 8,418,959 B2* | 4/2013 | Kang | B64C 39/024 | 244/116 |
| 8,453,966 B2* | 6/2013 | McGeer | B64F 5/40 | 244/110 F |
| 8,511,606 B1* | 8/2013 | Lutke | B64C 39/024 | 320/109 |
| 9,499,265 B2* | 11/2016 | Sanz | H02J 7/0044 | |
| 9,701,425 B2* | 7/2017 | Lee | B64F 1/007 | |
| 9,845,165 B2* | 12/2017 | Michalski | G08G 5/0065 | |
| 10,124,912 B2* | 11/2018 | Walsh | B64C 39/024 | |
| 10,156,854 B2* | 12/2018 | Yang | G05D 1/0011 | |
| 10,414,493 B2* | 9/2019 | McGeer | B64C 39/024 | |
| 10,495,784 B2* | 12/2019 | Shimizu | B64B 1/62 | |
| 10,556,709 B1* | 2/2020 | Kimchi | B64U 80/84 | |
| 10,611,498 B2* | 4/2020 | Schweighart | B64F 1/029 | |
| 10,625,879 B2* | 4/2020 | Di Benedetto | B64F 1/36 | |
| 10,870,498 B2* | 12/2020 | Zambelli | B64C 39/00 | |
| 10,899,472 B2* | 1/2021 | Carthew | B64F 1/06 | |
| 10,974,849 B2* | 4/2021 | Kim | B64F 1/222 | |
| 11,027,858 B2* | 6/2021 | Di Benedetto | G06V 20/52 | |
| 11,142,339 B2* | 10/2021 | Dennis | B64F 1/029 | |
| 11,181,933 B2* | 11/2021 | Di Benedetto | B64U 50/19 | |
| 11,214,367 B2* | 1/2022 | Brock | G07C 5/0816 | |
| 11,370,560 B2* | 6/2022 | Nishikawa | B64D 47/08 | |
| 11,479,368 B2* | 10/2022 | Sohmshetty | B64C 39/024 | |
| 11,524,798 B2* | 12/2022 | Strobel | B64F 1/222 | |
| 11,603,218 B2* | 3/2023 | Fisher | B64F 1/222 | |
| 11,609,581 B2* | 3/2023 | Carthew | G05D 1/0684 | |
| 11,634,221 B2* | 4/2023 | Chen | G05D 23/20 | 244/110 E |
| 2007/0016371 A1* | 1/2007 | Waid | G01S 19/51 | 701/470 |
| 2007/0228214 A1* | 10/2007 | Horak | B64C 39/028 | 244/63 |
| 2009/0224097 A1* | 9/2009 | Kariv | B64F 1/029 | 244/110 F |
| 2009/0314883 A1* | 12/2009 | Arlton | F41A 9/13 | 244/63 |
| 2011/0068224 A1* | 3/2011 | Kang | B64C 39/024 | 244/116 |
| 2014/0091172 A1* | 4/2014 | Arlton | B64C 27/605 | 244/17.23 |
| 2014/0110527 A1* | 4/2014 | Sing | B64D 9/00 | 244/118.1 |
| 2014/0217242 A1* | 8/2014 | Muren | B64C 39/024 | 244/4 R |
| 2015/0051758 A1* | 2/2015 | Cho | G05D 1/0858 | 701/16 |
| 2015/0321758 A1* | 11/2015 | Sarna, II | B64C 39/024 | 244/63 |
| 2016/0009413 A1* | 1/2016 | Lee | G08G 5/025 | 701/16 |
| 2017/0225802 A1* | 8/2017 | Lussier | E04H 12/003 | |
| 2018/0029723 A1* | 2/2018 | Krauss | B64F 1/0299 | |
| 2018/0050823 A1* | 2/2018 | McGeer | B64F 1/04 | |
| 2018/0079530 A1* | 3/2018 | Wyrobek | B64F 1/0297 | |
| 2018/0086481 A1* | 3/2018 | Briggs | B64C 39/024 | |
| 2018/0134412 A1* | 5/2018 | Poh | B64F 1/0299 | |
| 2019/0177005 A1* | 6/2019 | Kim | B64F 1/222 | |
| 2021/0179290 A1* | 6/2021 | Falk-Petersen | B64C 39/024 | |
| 2021/0253242 A1* | 8/2021 | Falk-Petersen | B60P 3/11 | |

* cited by examiner

DEVICE FOR STORING AND REMOTELY LAUNCHING UNMANNED AERIAL VEHICLES

CROSS-REFERENCE TO RELATED APPLICATIONS

This application is a continuation of International Patent Application No. PCT/US2019/035676 filed Jun. 5, 2019 and entitled "DEVICE FOR STORING AND REMOTELY LAUNCHING UNMANNED AERIAL VEHICLES," which is incorporated herein by reference in its entirety.

International Patent Application No. PCT/US2019/035676 filed Jun. 5, 2019 claims priority to and the benefit of Norway Patent Application No. 20180791 filed Jun. 7, 2018 and entitled "Device for Storing and Remotely Launching Unmanned Aerial Vehicles," which is hereby incorporated by reference in its entirety.

TECHNICAL FIELD

One or more embodiments of the present disclosure relate generally to unmanned aerial vehicles (UAVs) and more particularly, for example, to devices, systems and methods for storing, remotely launching, and controlling one or more UAVs.

BACKGROUND

In many military and civilian operations, it is often desirable to have personnel remain positioned in, and protected by, a vehicle. The confinement of a vehicle, however, offers few possibilities to investigate areas of interest, and limited situational awareness and overview, without additional aids. In many scenarios, it may be critical to increase situational awareness when confined to a vehicle, such as by use of a UAV. However, it may be difficult to launch a UAV without putting personnel at risk. In view of the foregoing, there is a continued need for improved systems and methods for launching, storing and controlling UAVs from mobile locations, such a vehicle.

SUMMARY

In various embodiments, specialized vehicle launch systems and methods are provided to enable personnel to launch and operate one or more UAVs from the safety of a vehicle or other mobile location. In various embodiments, a launch system comprises a launch device and an operator terminal. The launch device is adapted to be mounted on an exterior surface of a vehicle and is communicably coupled to the operator terminal, which is operable from the interior of the vehicle or other protected location. The vehicle launch system allows an operator to control one or more UAVs from inside the vehicle, without requiring the operator to step outside of the vehicle to interact with the UAV or launch device.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the disclosure and their advantages are best understood by referring to the detailed description that follows. It should be appreciated that like reference numerals are used to identify like elements illustrated in one or more of the figures.

DETAILED DESCRIPTION

Aspects of the present disclosure generally relate to systems and methods for launching, storing and controlling unmanned aerial vehicles (UAVs). In various embodiments, specialized vehicle launch systems and methods are provided to enable personnel to launch and operate one or more UAVs from the safety of a vehicle or other mobile location.

Figure 1A:
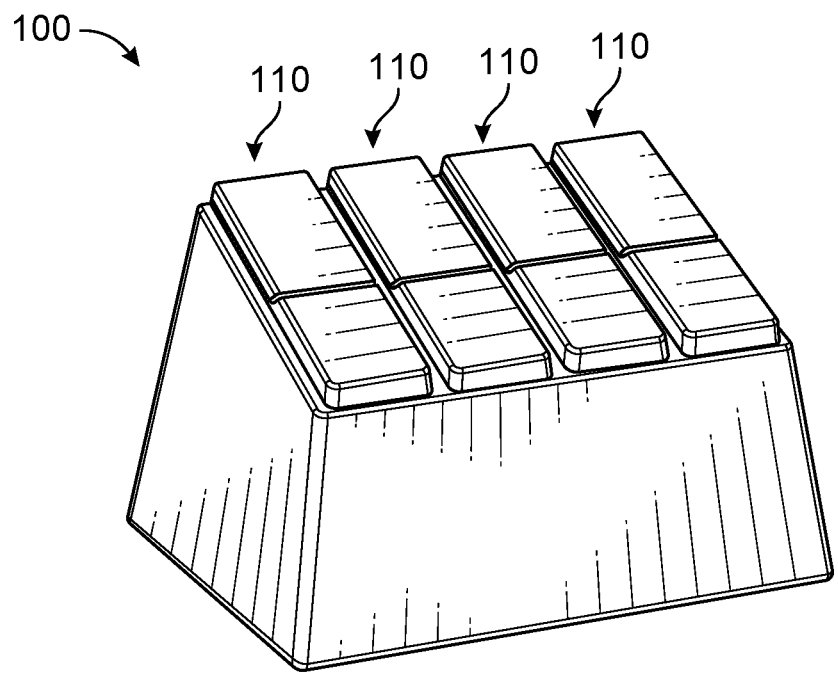
FIGS. 1A-C illustrate a vehicle launch system, in accordance with embodiments of the present disclosure.
Figure 1B:
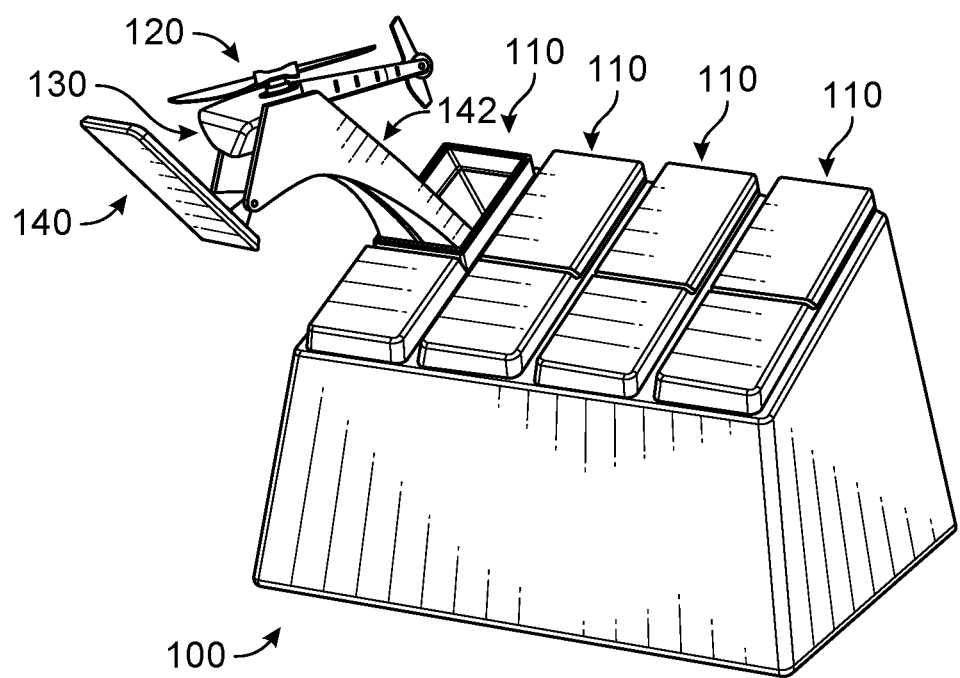
Figure 1C:
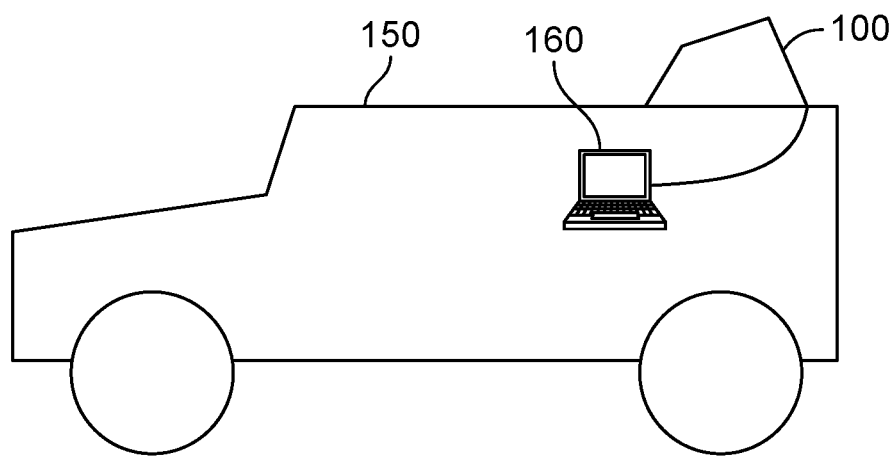

Various embodiments of a vehicle launch system will be described with reference to FIGS. 1A-C. The vehicle launch system comprises a launch box 100 (also referred to herein as a launch device) and an operator terminal 160. The launch box 100 is adapted to be mounted on an exterior surface of a vehicle 150, such as a ground vehicle, water vehicle or other mobile structure. In various embodiments, the launch box 100 may be mounted to another device or structure and/or be operated as a standalone unit. The operator terminal 160 is a mobile computing device communicably coupled to the launch box 100 and operable from the interior of the vehicle 150 or another protected location. The vehicle launch system allows an operator to control one or more UAVs (such as UAV 120) and launch the UAV 120 from inside the vehicle 150, without requiring the operator to step outside of the vehicle 150 to interact with the UAV 120 or launch box 100.

In the illustrated embodiment, the launch box 100 comprises a plurality of magazines 110 (also referred to herein as cassettes) adapted to be securely inserted into a corresponding plurality of cavities (or recesses) formed in the launch box 100. One magazine 110 holds a single UAV 120 in its enclosure, which is positioned in a cradle 130 of the magazine 110. The magazine 110 is further adapted to move the UAV 120 from a storage position inside the magazine 110 (as illustrated in FIG. 1A) to a launch position (as illustrated in FIG. 1B), by an actuator attached to an arm 142 to move the UAV such that it is positioned outside of the magazine 110 for launch. Each magazine 110 is adapted to be easily removed and replaced with another magazine 110, which may include another UAV 120.

The cradle 130 is positioned on, or constitutes of, one side of a lid 140 of the magazine 110. The cradle 130 comprises charging points for charging the UAV 120 while it is in the cradle 130. The cradle 130 further includes a release mechanism to hold the UAV 120 in the cradle 130 while in the storage position, and release the UAV 120 during launch (e.g., when the UAV 120 is positioned in a launch position as illustrated in FIG. 1B). The cradle 130 may also couple the UAV 120 to the operator terminal 160 for communications through a communications link. In various embodiments, the magazine 110 comprises one or more connectors configured to mate with a corresponding connector of the launch box 100 connecting the magazine to a power supply, such as a power supply of the vehicle 150, the operator terminal 160, an internal battery, or other power source. When the magazine 110 is positioned in the launch box 100, the UAV 120 may be charged. In various embodiments, there may be additional connections enabling communication between the UAV 120 and the operating terminal 160, including wireless, and wired communications links. In some embodiment, the launch box 100 comprises electronics for communicating with and controlling the UAV 120. For example, the release mechanism may be adapted to close (e.g., hold the UAV 120 in the cradle) in response to a "close" instruction or command received from the operator terminal 160 through the launch box 100, and open (e.g., release the UAV 120) in response to an "open" instruction or command received from the operator terminal 160 through the launch box 100.

In various embodiments, the launch box 100 is further adapted to protect the UAV 120 from weather conditions. For example, the launch box 100 may comprise one or more components for cooling the inside of the launch box, such as a cooling fan. The launch box 100 may further comprise components, such as heating wires, for heating the interior and/or exterior walls of the launch box 100 to facilitate the removable of snow and ice.

In some embodiments, the actuator, arm 142 and lid 140 and related assembly are configured to break ice and obstacles positioned on the outside of the lid 140 when the arm 142 is moved from the storage position (e.g., when the lid 140 is in a closed position) to the launch position (e.g., when the lid 140 is in an open position). In one embodiment, a rotational point where the lid of the magazine is fastened is provided with play in a vertical direction and a spring that pushes up. When the actuator is activated, moving the arm 142, but fails to open the lid 140 (e.g., because ice has formed around the lid), the upwards force will translate to movement of the lid 140, relative to the hinge by the spring. The play around the hinge will enable the actuator to push the front of the lid 140 outwards. This reduces the amount of movement the actuator will have to work with, making for a higher force, potentially moving the obstacle, e.g. breaking the ice on top.

During operation, the UAV 120 is maintained in a storage position, protected from the environment, charged and ready for operation. When the operator provides an instruction from the operator terminal 160, the actuator activates, moving the UAV 120 from the storage position to the launch position. The UAV 120 starts on instruction from the operator terminal 160, and provides enough thrust to climb, the release mechanism on the cradle 130 opens and the UAV 120 is launched to investigate the area of interest. In various embodiments, the flight path and control of the UAV 120 may be preprogrammed, programmed by the operator terminal 160 (e.g., while the UAV 120 is cradled), or controlled during flight by flight controls on the operator terminal 160. In some embodiments, the UAV 120 ends the flight by landing on the cradle 130 and returning to the storage position in the magazine 110. Flight data such as images and video captured during flight may be downloaded from the UAV 120 to the operator terminal 160 through a communications link.

Figure 2A:
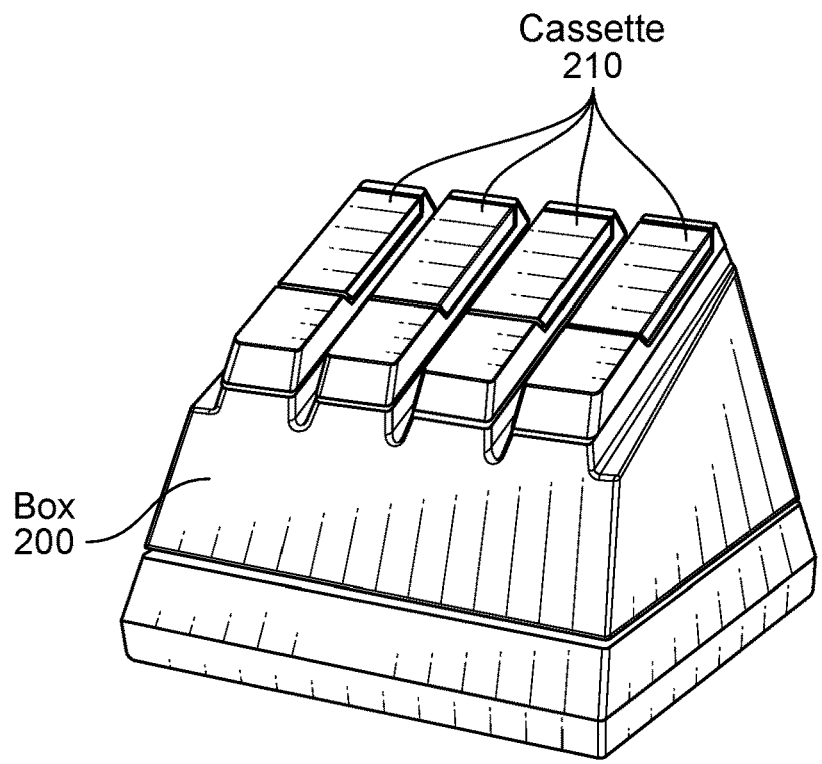
FIGS. 2A-B illustrate a vehicle launch box, in accordance with embodiments of the present disclosure.
Figure 2B:
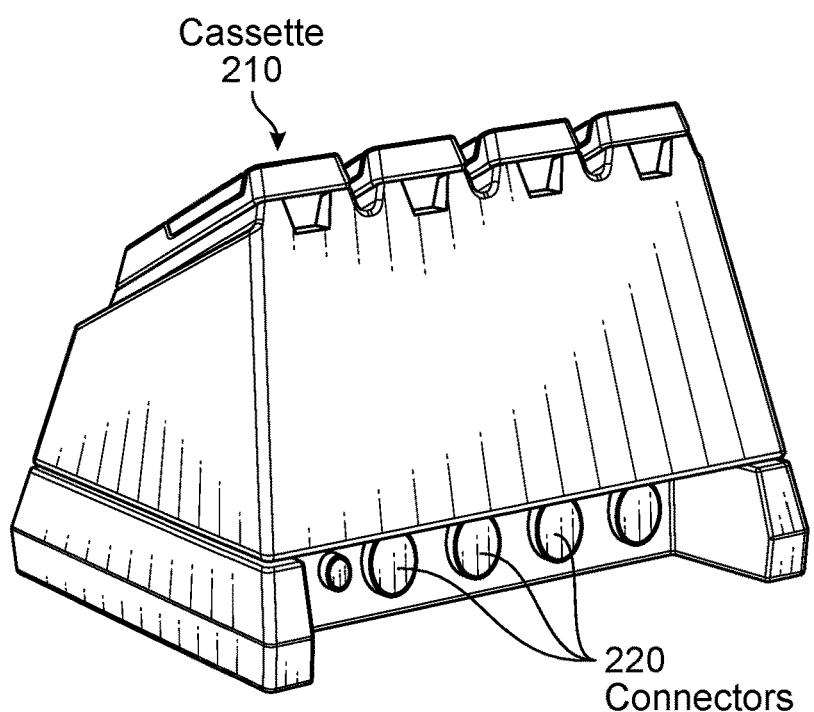

Referring to FIGS. 2A-B, an embodiment of a vehicle launch box will described. In various embodiments, the launch box 200 may be used in civilian settings, military settings and other environments, and may be adapted to fit vehicles including ground vehicles such as consumer automobiles and military vehicles, such as battle tanks, and water vehicles. In one embodiment, the launch box 200 may be mounted (e.g., bolted at connector points designated in the bottom of launch box) to the outside of a vehicle in a position such that actuation of the magazine and launch of the UAV is unobstructed. In one embodiment, the launch box is adapted to fit one or more UAVs, which may include single rotor, quadcopters, and other types of UAV/drones. In the illustrated embodiment, the launch box base is approximately 40×30 centimeters and 25 centimeters tall at the tallest point, but other dimensions may be used in accordance with the present disclosure. Although the illustrated embodiment includes 4 removable and replaceable cassettes 210, other numbers of cassettes may be utilized consistent with the present disclosure. In various embodiments, the cassettes 210 can be easily inserted and/or removed from one or more launch boxes. The UAVs may be easily loaded or removed from one or more cassettes before or after insertion of the cassette into a launch box. Power to the launch box 200 may be supplied by the vehicle power supply, by an internal battery unit or through another available power source.

The launch box 200 may be remotely controlled by the operator positioned in the vehicle, which may facilitate wired communications between an operator terminal and the launch box 200. An antenna positioned at the back of the box may be provided for wireless transmission to/from the operating UAV and/or operator terminal. Connectors 220 disposed on the back of the launch box connect the launch box 200 to the operator control unit, a power supply, environmental sensors and other communications links.

Figure 3:
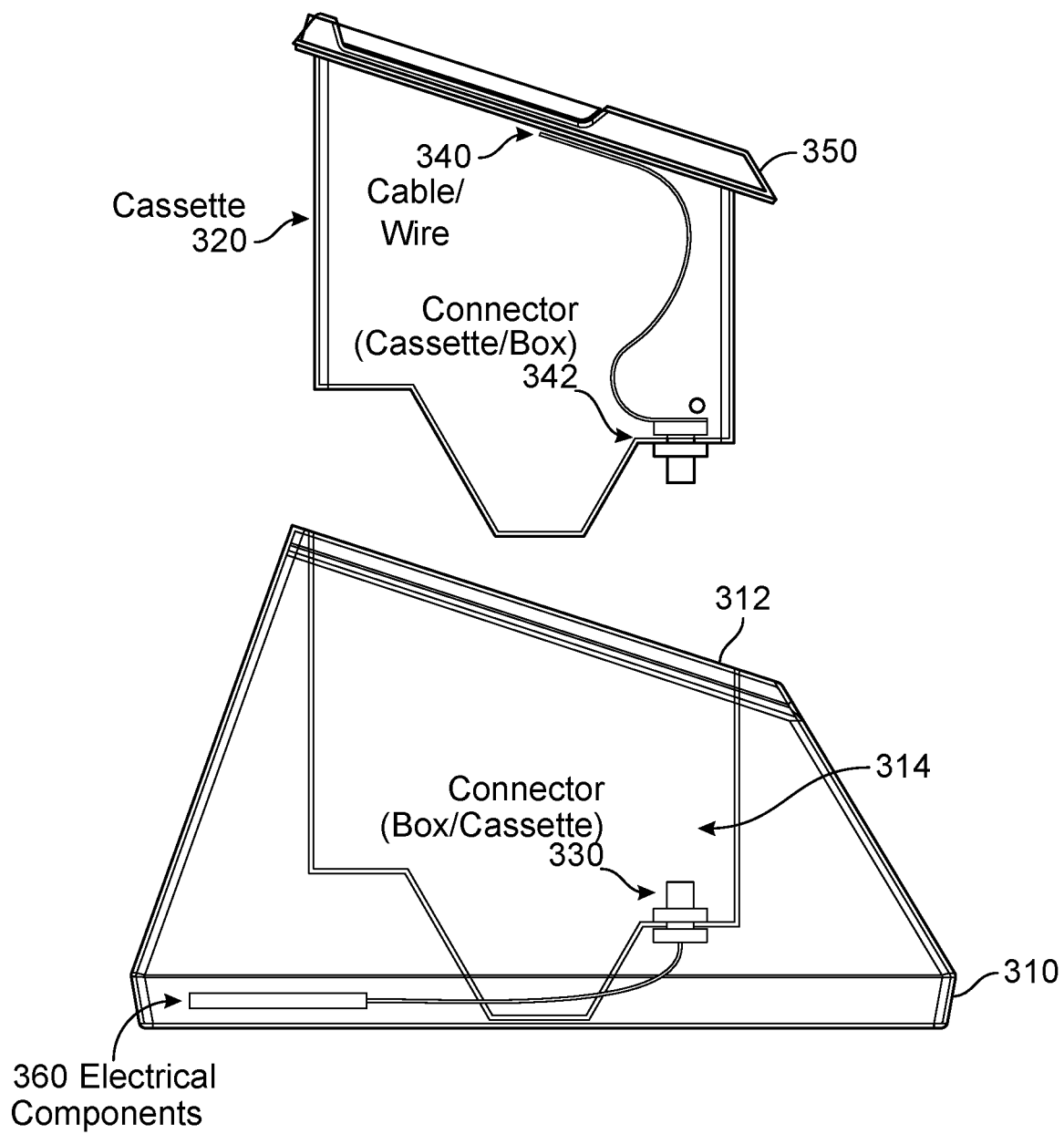
FIG. 3 illustrates cassette and launch box housing, in accordance with embodiments of the present disclosure.

Various embodiments of the cassette and launch box housing will now be described in further detail with reference to FIG. 3. As illustrated, a launch box housing 310 includes a top portion 312 having a cavity 314 (or recess) formed therein and adapted to receive and secure a cassette 320. The launch box housing 310 may be formed or constructed in one or more pieces comprises a durable plastic, metal, composite, or other materials suitable to rigidly secure the launch box to a vehicle and the UAV inside the cassette during vehicle travel and withstand environmental conditions associated with the intended use. The cassette 320 is adapted to fittably insert into the cavity 314 to secure the cassette therein, and may be adapted to snap into position in the launch box housing 310. In one embodiment, the cassette 320 includes a top portion 350 having a lip that that contacts the surface of the top portion 312 of the launch box housing 310 when the cassette 320 is inserted into the cavity 314. As illustrated, the cassette 320 may be simply inserted and removed and remains securly positioned in the launch box housing 310 during travel. It will be appreciated that the launch box housing 310 may include a plurality of cavities, each adapted to receive a corresponding cassette 320.

In various embodiments, the cassette 320 includes one or more cables or wires providing power and/or communications to the cassette and UAV. As illustrated, a cable 340 couples a connector 342 to the UAV cradle. The launch box housing 310 includes a corresponding connector 330 at the bottom of the cavity 314 and arranged to mate with connector 342 when the cassette 320 is inserted into the cavity 314. When the connector 330 in the bottom of the box mates with the corresponding connector 342 in the cassette 320, charging and/or control of the UAV is provided by a wired connection. As illustrated, when the connectors 330 and 342 are joined, the cassette 320 and UAV are coupled to electrical components 360 of the launch box which facilitate control and communications with the cassette and UAV, and provides power to charge the UAV and operate mechnisms and components within the cassette 320.

In some embodiments, the cassette 320 and launch box housing 310 include weather proofing such seals, insulation, heating wires embedded in the cassette 320 and/or launch box housing 310 to melt ice and snow, cooling mechanisms such as a cooling fan in an open space in the interior of the launch box housing 310, and other weather proofing as appropriate for the environment.

Figure 4:
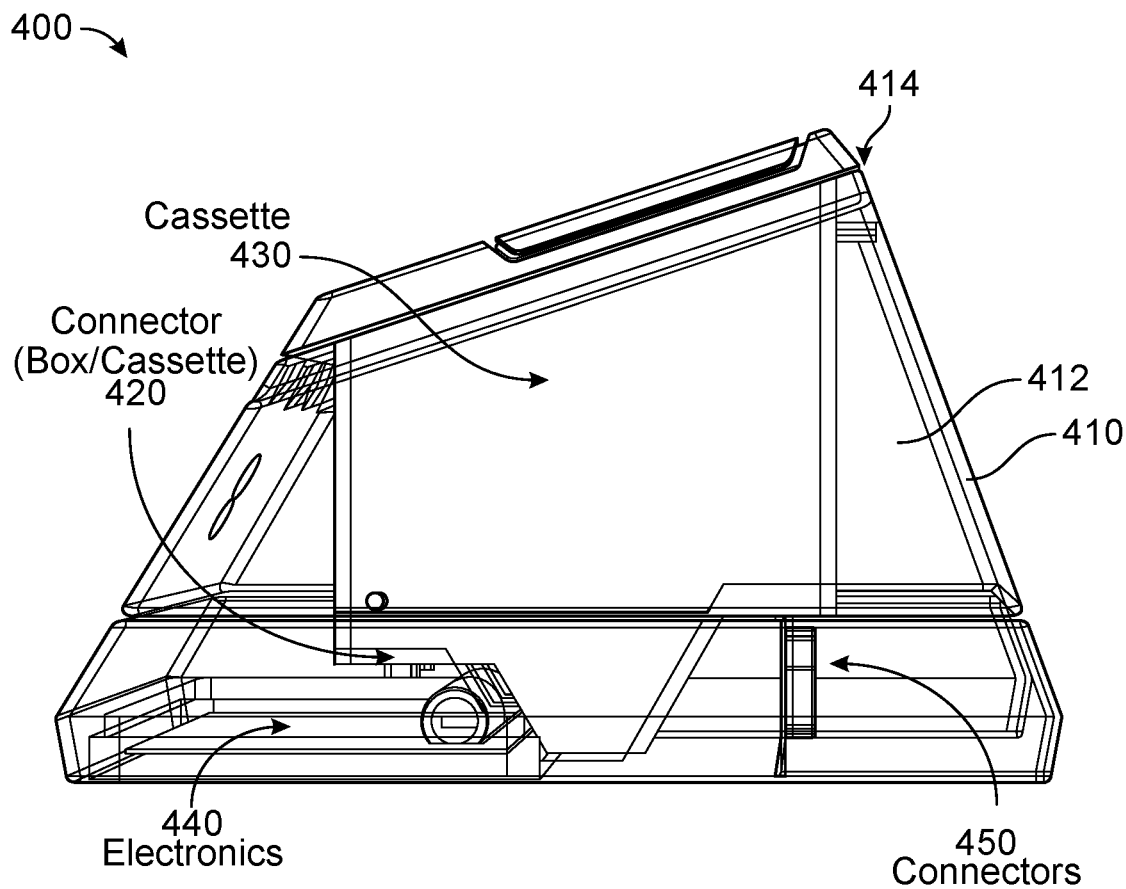
FIG. 4 illustrates a side view of a launch box, in accordance with embodiments of the present disclosure.

Referring to FIG. 4, a side view of an embodiment of a launch box 400 is illustrated. The launch box 400 includes a housing 410 having an internal cavity 412 accessible through an opening 414 on the top of the housing 410. A cassette 430 is fitably engaged with housing 410 to secure the cassette 430 for travel and storage of a UAV. In this position, connectors 420 are engaged to provide power and communications to the UAV. The launch box 400 may also include electronics 440, such as a printed circuit board and/or other control components providing communications with the UAV and cassette 430 (e.g., actuator control to raise or lower the actuator arm and cradle between storage and launch positions) through the connectors 420. External connectors 450 provide power and communications to the launch box 400 from the vehicle, operator terminal or other wired connection. In various embodiments, the electrical components, including connectors 450, wiring and circuitry, may comprise standard components suitable for automotive or military vehicle electronical systems.

Figure 5A:
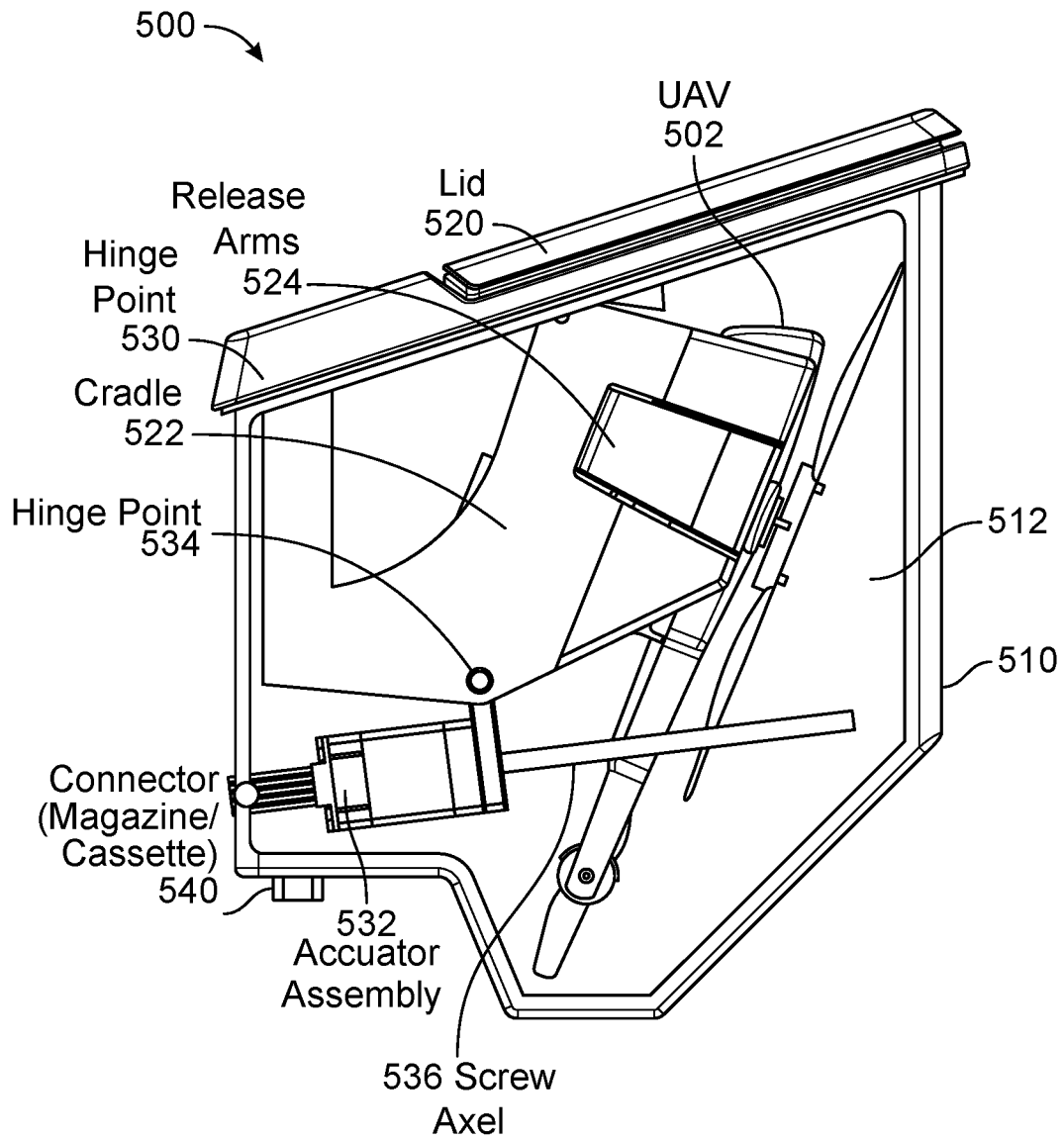
FIG. 5A illustrates a cassette securing a UAV in a storage position, in accordance with embodiments of the present disclosure.

Referring to FIG. 5A, an embodiment of a cassette 500 securing a UAV 502 in a storage position will now be described. The cassette 500 comprises a housing 510 having an exterior adapted to fit securly in a cavity (or recess) of a launch box, and an interior 512 adapted to house the UAV 502 and cassette components (also referred to herein as a launch mechanism and releated components) therein and enable movement of the UAV 502 and other cassette components between the storage position and launch position as described herein. In the storage position, the lid is closed, and the UAV 502 is held on the cradle 522. Cradle 522 is a structure adapted to securely hold the UAV 502, and includes a release mechanism including release arms 524 adapted to hold the UAV 502 in the cradle when engaged, and release the UAV 502 when the release arms 524 are opened. The cradle 522 is coupled to the cassette housing 510 at a first hinge point 530, and to an actuator assembly 532 at a second hinge point 534. In the illustrated embodiment, the actuator assembly 532 comprises a lead screw step motor which is mounted to the cassette housing 510 at a first end. The lead screw step motor traverses a screw axel 536 when activated via the connector 540 to open the lid 520 to move the UAV 502 into a launch position.

Figure 5B:
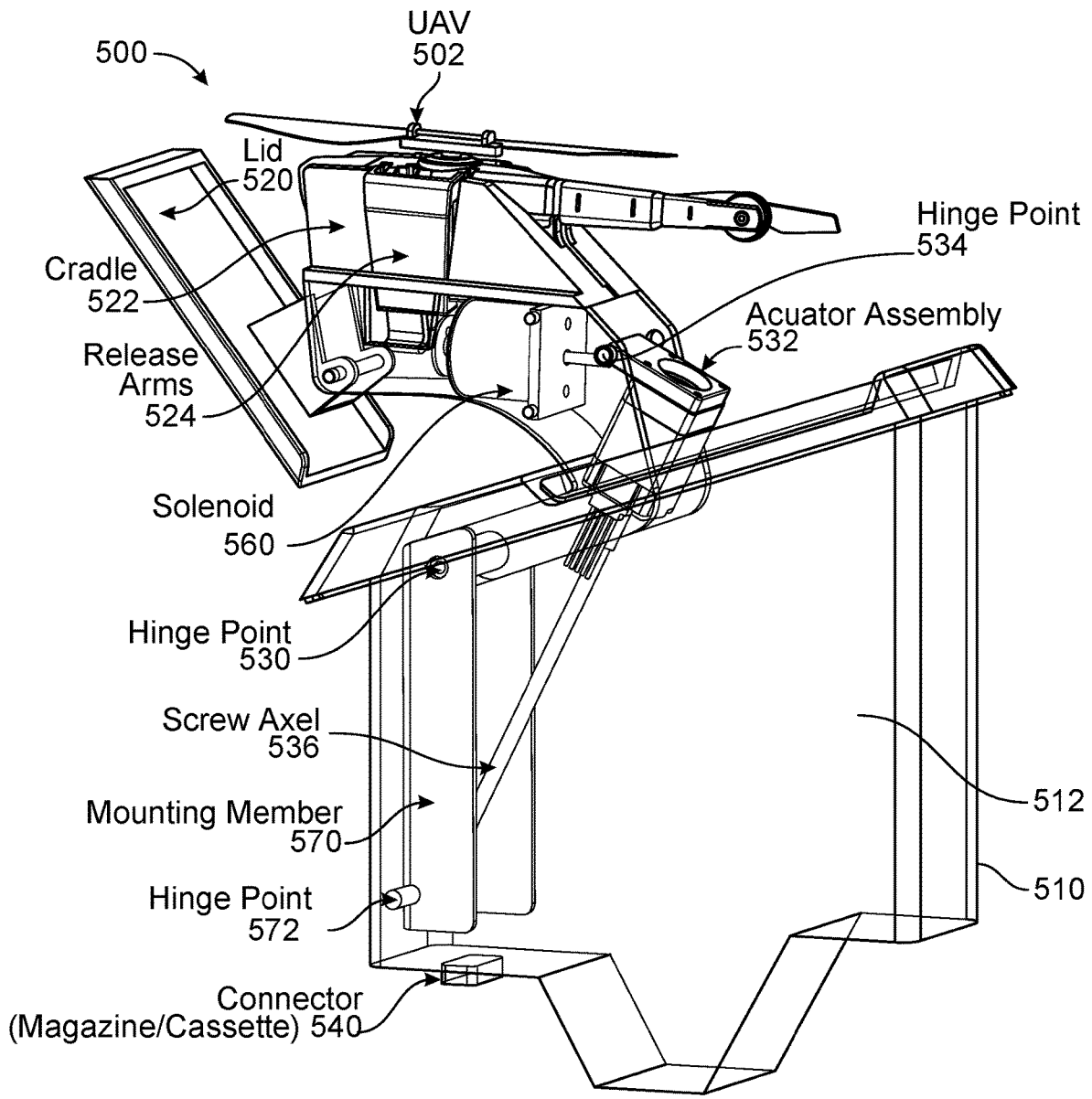
FIG. 5B illustrates a cassette securing a UAV in a release/launch position, in accordance with embodiments of the present disclosure.

An embodiment of a launch/release position is illustrated in FIG. 5B. As illustrated, the lead screw step motor (DC) has traversed the screw axel 536 to open the lid 520 and position the UAV 502 for launch. In the release position, the cradle 522 is in a second position, having pivoted around a hinge point 530 connected to the cassette housing 510 and a hinge point 534 connected to the actuator assembly 532. As illustrated, the hinge point 530 is connected to the cassette housing 510 through mounting members 570, which also pivotably connect one end of the screw axel 536 to the cassette housing 510 at hinge point 572.

Figure 11:
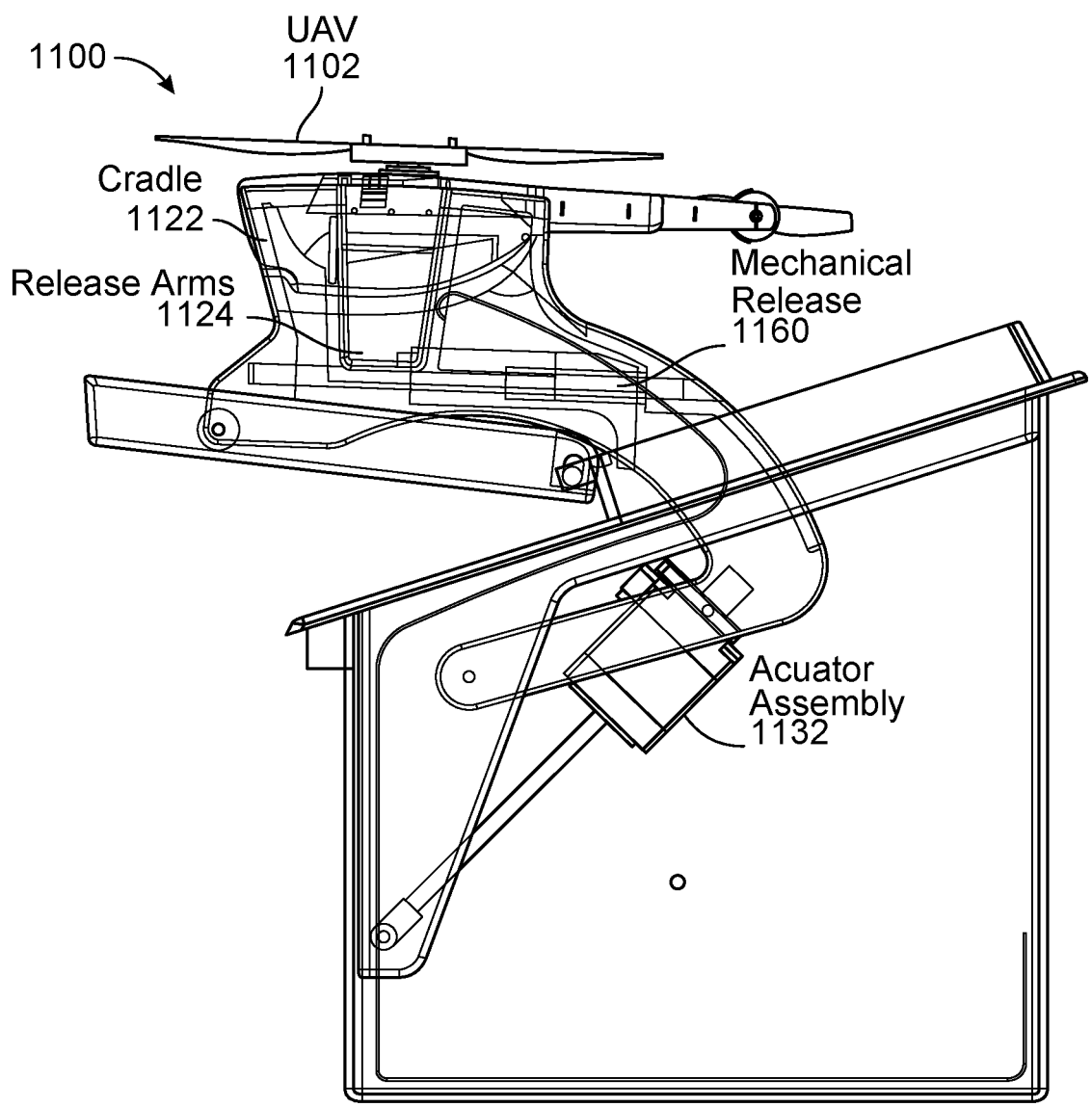
FIG. 11 illustrates a cassette securing a UAV in a release/launch position and an embodiment of a mechanical release assembly, in accordance with one or more embodiments.

A solenoid 560 is positioned below the cradle and is operable to engage or release the release arms 524. In other embodiments, the release arms may be controlled by other mechnisms and components, such as a micro actuator or a mechanical release assembly as illustrated in the embodiment of FIG. 11. The UAV 502 is positioned in the cradle 522 and held in place by the release arms 524 when in a closed position. While positioned in the cradle 522, the UAV 502 is charged by a power supply coupled to the UAV 502 through connector 540 and/or operationally controlled by an operator using the operator terminal. In one embodiment, the cradle 522 includes charging contacts to engage with corresponding charging contacts on the UAV 502. In other embodiments, the cradle 522 may include an inductive charging pad, a connector or other mechanisms to facilitating charging of the UAV 502. In the launch position the UAV 502 may continue to be charged and is also available for operator control, including instructions to launch the UAV 502. The actuator assembly 532, when operated, opens and/or closes the lid 520 and positions the cradle 522 and UAV 502 between the storage and launch positions. The actuator assembly 532 may be calibrated/tested when the cassette 500 is positioned in the laucn box housing to get correct angle before takeoff when the lid 520 is opened (e.g., to avoid collision or interference between components of the launch box and the UAV 502 propellor rotor). The connector 540 provides a connection to the launch box, vehicle and/or operator terminal providing a connection to a power source, control unit and communications components. The cassette 500 may include one or more weather proofing components, such as heating wires and/or a cooling fan.

In various embodiments, the operator may instruct the UAV 502 to launch and engage in a flight mission under operator control through the operator terminal or through a preprogrammed flight scenario. The UAV 502 may return to the launch box and land on the cradle 522. The solenoid may close the release arms 524 when the UAV is in the cradle 522, securely holding the UAV 502 in place. The actuator assembly 532 may then be instructed to close the lid 520 and move into the storage position until the next flight. While stored in the cradle 522, the UAV 502 can recharge. In some embodiments, the UAV 502 may communicate with the launch box and/or operator terminal to download flight information, including acquired images, through the connector 540.

Figure 6:
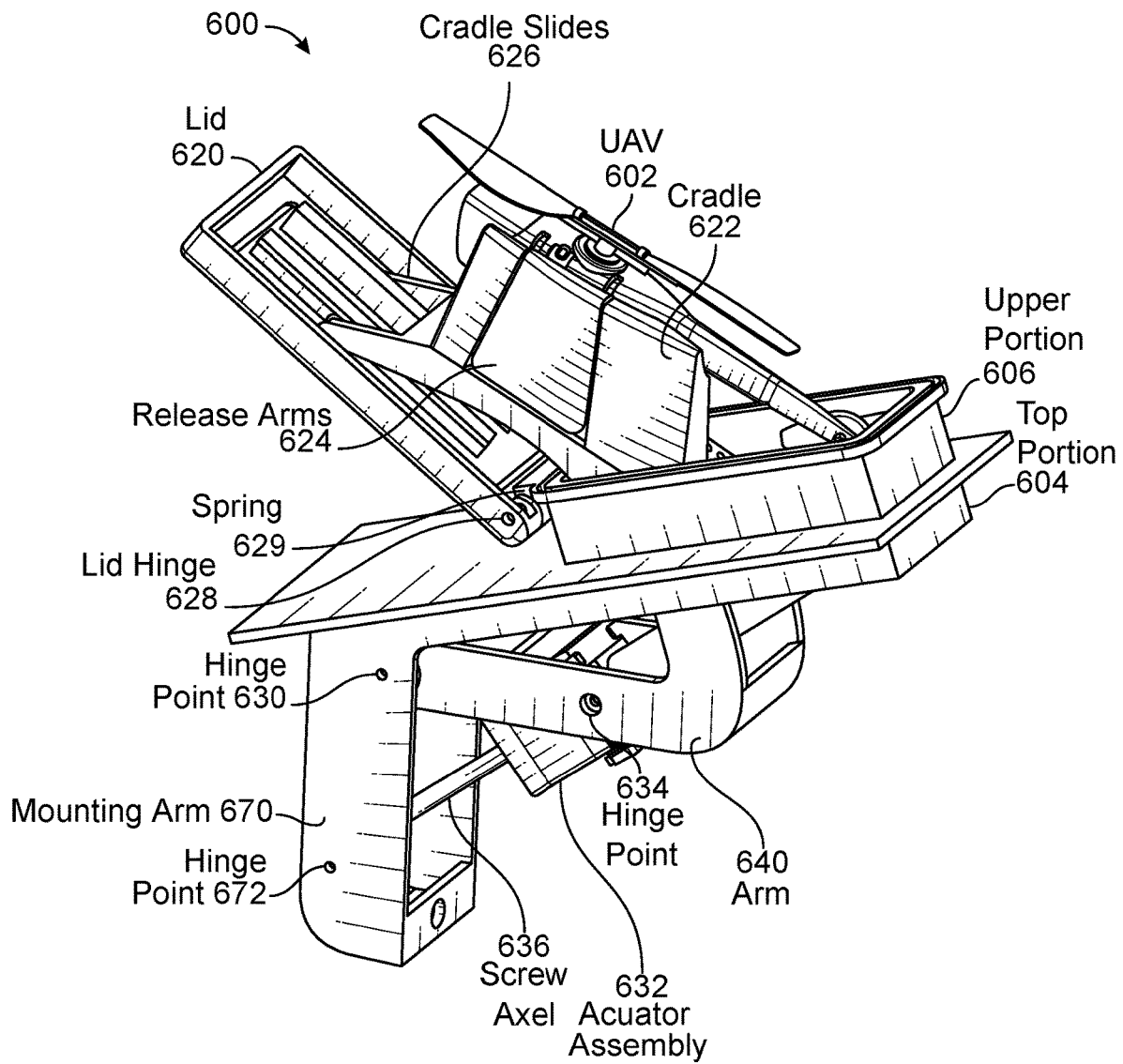
FIG. 6 illustrates a cassette securing a UAV in a release/launch position, in accordance with embodiments of the present disclosure.

Referring to FIG. 6, another embodiment of a launch mechanism in a release position will be described. In this embodiment, a cassette assembly 600 is illustrated in the release position, ready to launch the UAV 602 held in the cradle 622 by the release arms 624. The cassette assembly 600 includes a top portion 604 forming the top of the cassette, including an opening formed thereon and through an upper portion 606 for the cradle 622 and UAV 602 to pass through between the release and storage positions. The lid 620 is hinged to the cassette at the upper portion 606 at lid hinge point 628. The cradle 622 rotates through the opening, aided by a spring 629 that pushes up the lid. The cradle is slidably hinged to the lid 620 along cradle slides 626. The design is adapted to break free ice and obstacles positioned on the outside of the lid. In on embodiment, the lid hinge 628 is provided with play in a vertical direction and the spring 629 is biased to push up. If the actuator assembly 632 receives an instruction to move into release postion, but fails to open the lid 620 due to obstructions, the movement will translate to an upwards force on the lid 620. The play around the hinge 628 will enable the motor to push the front of the lid slightly, moving the obstacle, e.g. braking the ice or moving the dirt on top. In the illustrated emboidment, the top portion 604 includes mounting arms 670 that provide the hinge points 630 (for connecting an end of arm 640) and 672 (for connecting an end of the screw axel 636). A hinge point 634 connects the arm 640 to the actuator assembly 632.

Figure 7:
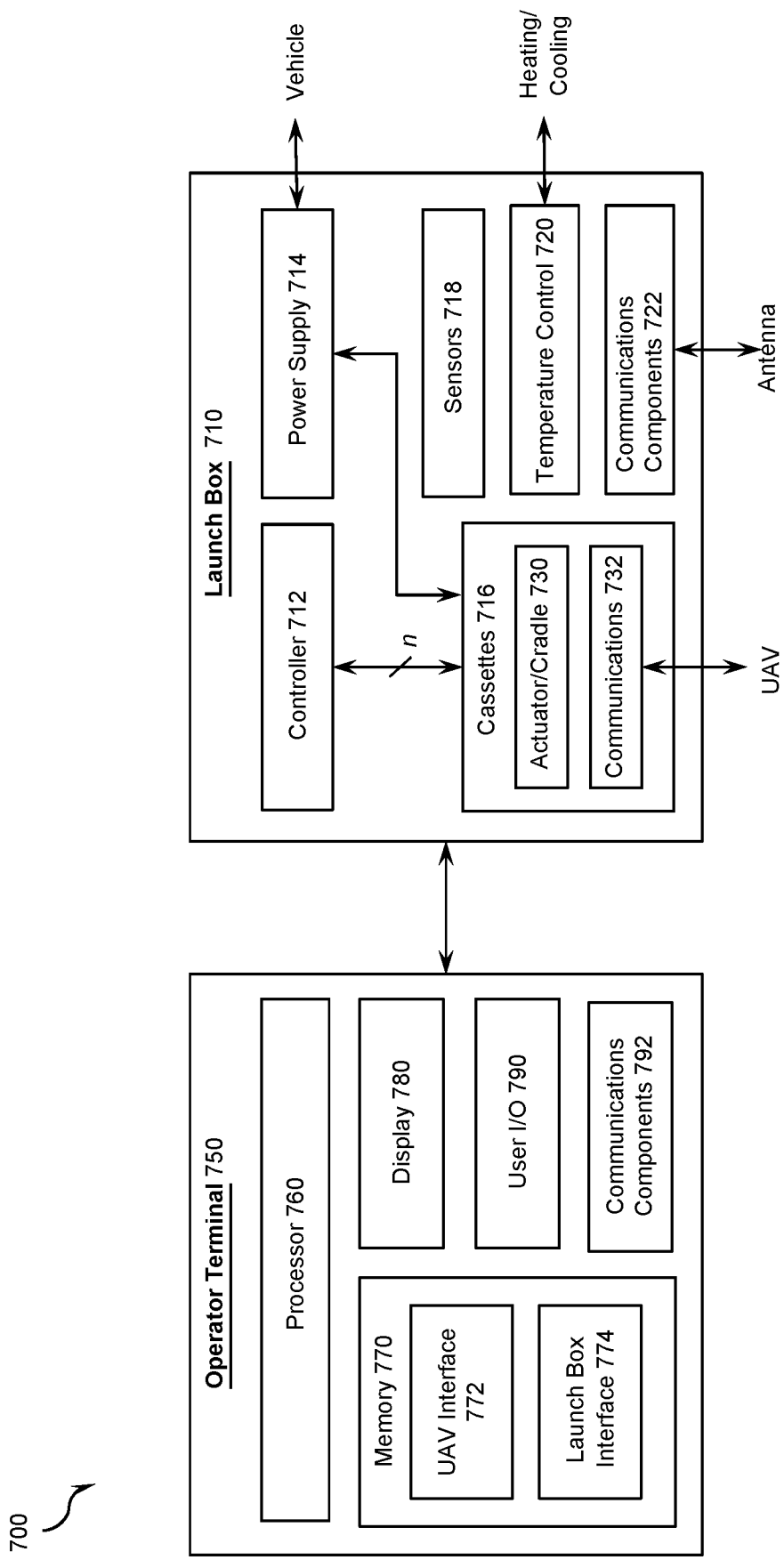
FIG. 7 illustrates electrical and processing components for a vehicle launch system, in accordance with embodiments of the present disclosure.
Figure 8A:
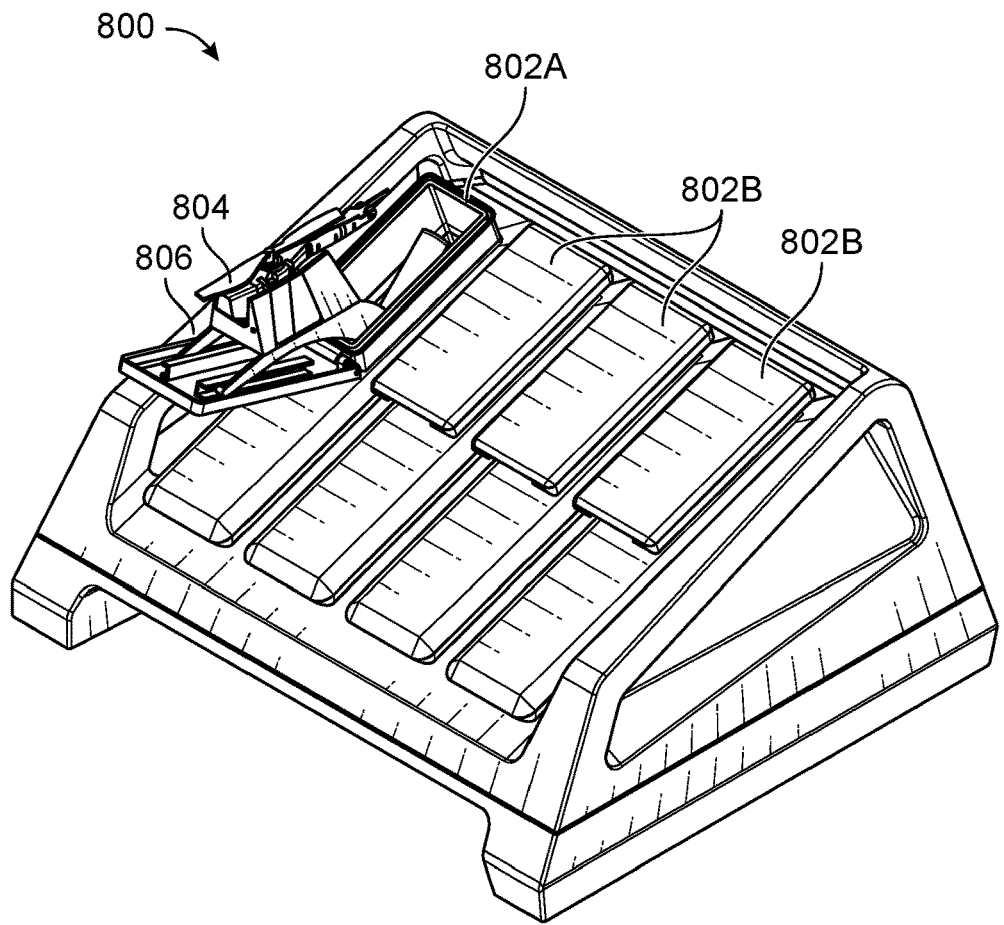
FIGS. 8A-I illustrate various views of a launch box and/or cassette in storage and launch positions, in accordance with embodiments of the present disclosure.
Figure 8B:
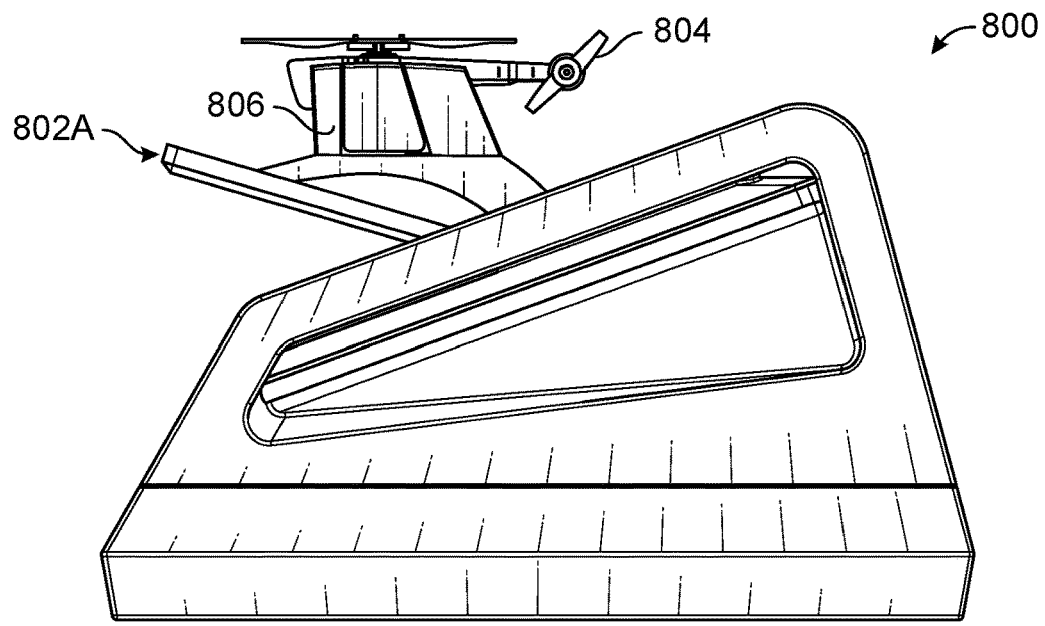
Figure 8C:
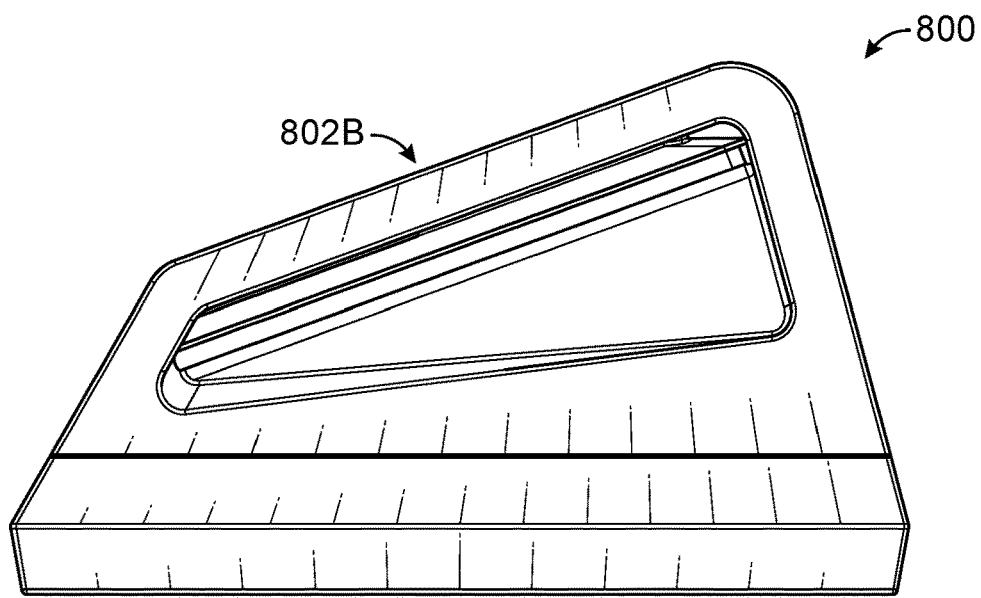
Figure 8D:
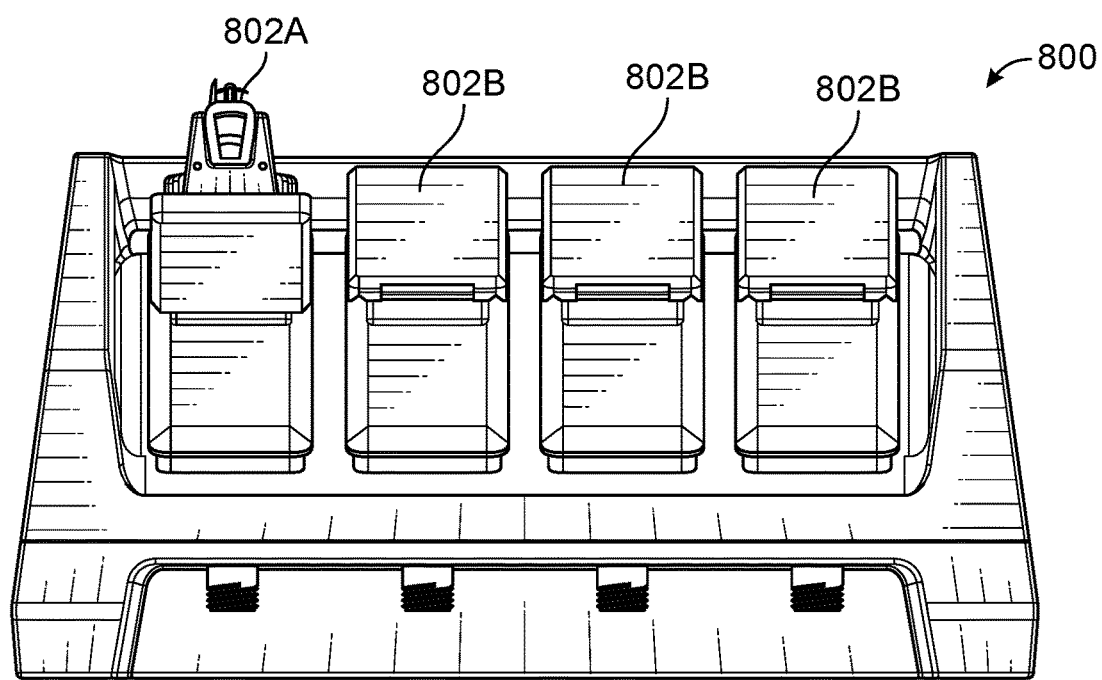
Figure 8E:
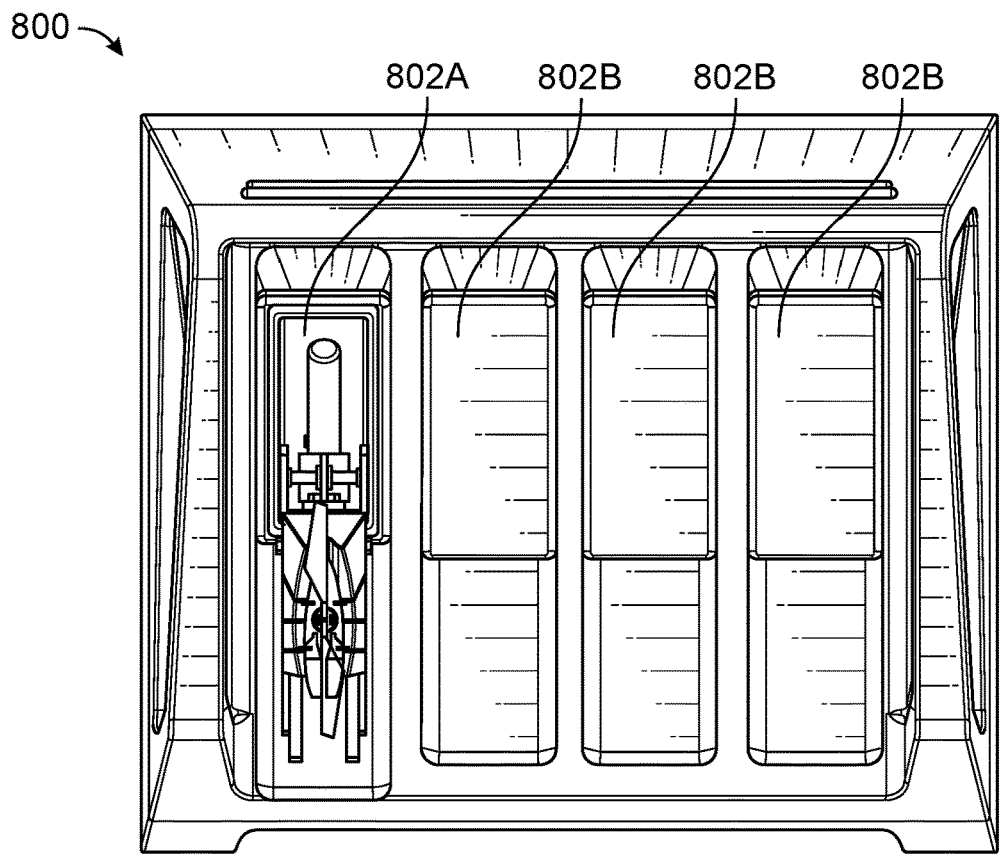
Figure 8F:
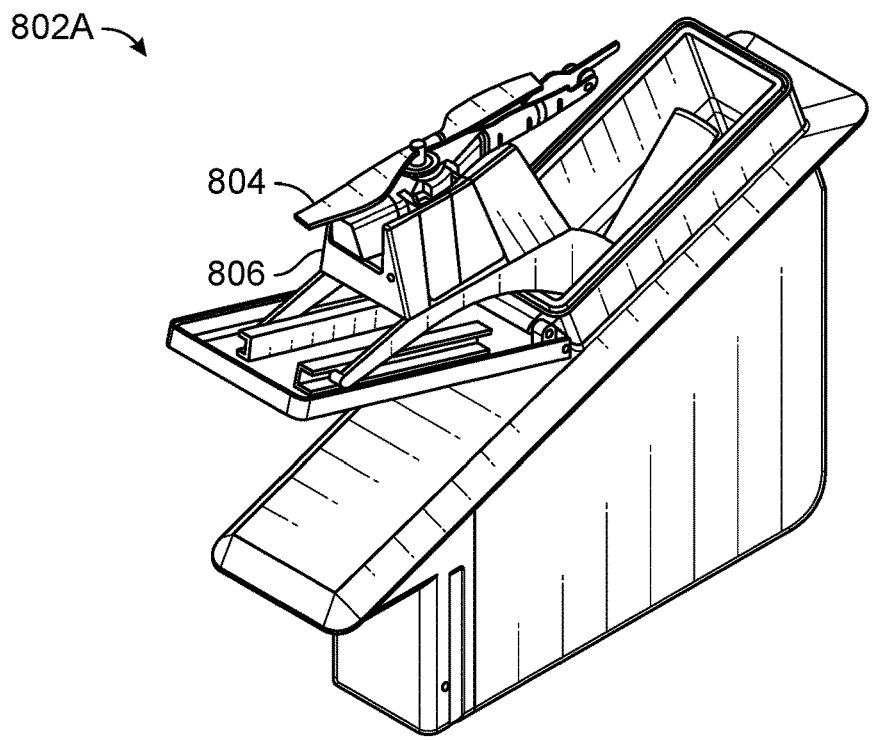
Figure 8G:
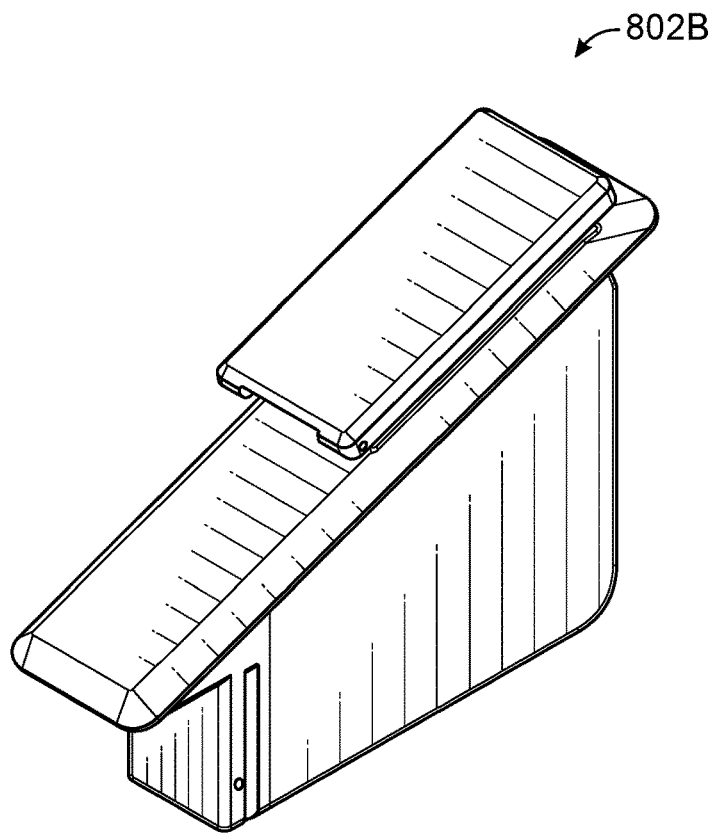
Figure 8H:
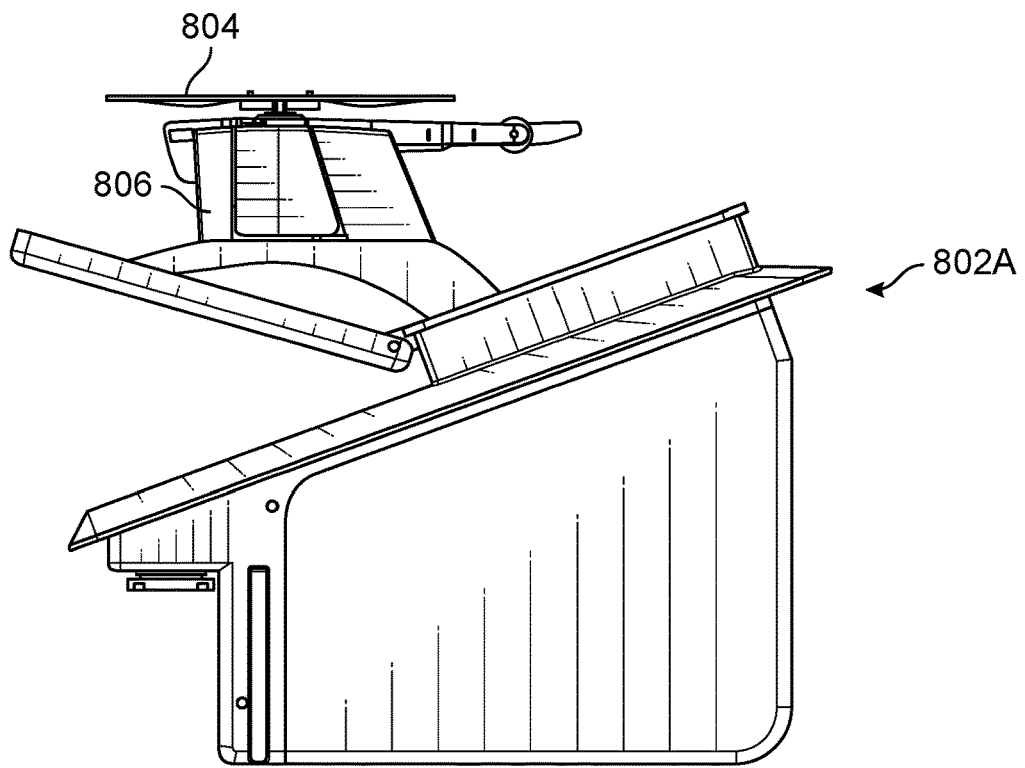
Figure 8I:
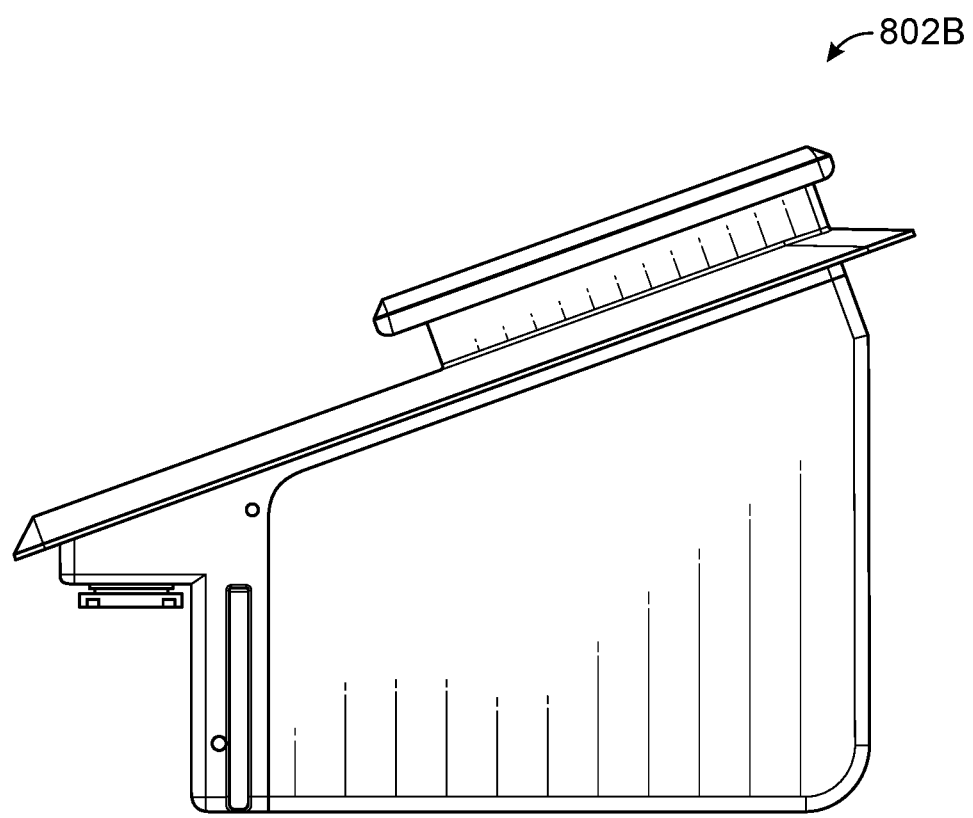

FIG. 7 illustrates electrical and processing components for a vehicle launch system in accordance with various embodiments of the present disclosure. A system 700 includes a launch box electrical components 710 and an operator terminal 750. The launch box electrical components 710 facilitate the operation of the launch box, including storing, charging, releasing, launching and communicating with UAVs cradled on inserted cassettes. In various embodiments, the launch box electrical components 710 includes a controller 712, power supply 714, cassettes 716 having electrical components coupled with the launch box electrical components 710, communications components 722, optional sensors 718 and optional temperature controls 720.

The controller 712 may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), or other processing devices used to control the operations of the launch box.

Power supply 714 may be implemented, for example, as one or more batteries and/or power connections to permit use of the launch box and charging of UAVs coupled thereto. In some emboidments, the power supply 714 is coupled to a vehicle power supply, which provides electrical power to the launch box.

Communications components may include wired and wireless interfaces. Wired interfaces may include communications links with the operator terminal 750 and the vehicle, and may be implemented as one or more physical network or device connect interfaces. Wireless interfaces may be implemented as one or more WiFi, Bluetooth, cellular, infrared, radio, and/or other types of network interfaces for wireless communications, and may facilitate communications with the operator terminal, vehicle, UAVs and other wireless device. In some embodiments, the communications components 722 include an antenna for communications with a UAV during flights.

In various embodiments, the controller 712 is operable to provide control signals to each of a plurality of cassettes 716 inserted into the launch box (e.g., through a connector interface coupling the cassette electrical components to the launch box electrical components 710). In various embodiments, the controller 712 provides control signals to a cassette 716 to provide actuator/cradle 730 control (e.g., to move to a storage position or launch position; to close or open the release arms). Cradle communications components 732 provide communications between the controller 712 and a cradled UAV. In various embodiments, the controller 712 facilitates communications between the operator terminal 750 and cradled UAVs. The launch box electrical components 710 may also include optional temperature controls 720 for controlling heating and cooling components if implemented in the launch box. Optional sensors 718 may be provided for additional environmental feedback.

The operator terminal 750 is operable to communicate with and control the operation of the launch box 710. The operator terminal 750 includes a processor 760, a memory 770, a display 780, user input/output components 790 and communications components 792. The processor 760 may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), or other processing devices used to control the operator terminal. In this regard, processor 760 may execute machine readable instructions (e.g., software, firmware, or other instructions) stored in memory 770.

Memory 770 may be implemented as a machine readable medium storing various machine readable instructions and data. For example, in some embodiments, memory 770 may store an operating system and one or more applications as machine readable instructions that may be read and executed by processor 760 to perform various operations described herein. In some embodiments, memory 770 may be implemented as non-volatile memory (e.g., flash memory, hard drive, solid state drive, or other non-transitory machine readable mediums), volatile memory, or combinations thereof.

The memory 770 includes a UAV interface 772 and a launch box interface 774. The launch box interface 774 includes status, configuration and control features which may include all control features disclosed herein. For example, the launch box interface 774 may include identification of cassettes and UAVs coupled to the launch box, storage/launch status and control, UAV charging status and flight planning, control and information. The UAV interface 772 facilitates communications with the UAV before, during and after flight and may include flight controls for controlling the UAV during flight, and an interface for downloading and storing images and other data obtained by the UAV during flight.

Communications components 792 may include wired and wireless interfaces. A wired interface may be implemented as one or more physical network or device connection interfaces (e.g., Ethernet, and/or other protocols) configured to connect the operator terminal 750 with the launch box 710. Wireless interfaces may be implemented as one or more WiFi, Bluetooth, cellular, infrared, radio, and/or other types of network interfaces for wireless communications. In some embodiments, the operator terminal 750 includes wireless interfaces for communicating with the launch box and for direct communications with one or more UAVs.

Display 780 presents information to the user of operator terminal 750. In various embodiments, display 780 may be implemented as a liquid crystal display (LCD), an organic light emitting diode (OLED) display, and/or any other appropriate display. User input/output components 790 receive user input to operate features of the operator terminal 750, and may include flight controls for one or more UAVs.

Figure 9:
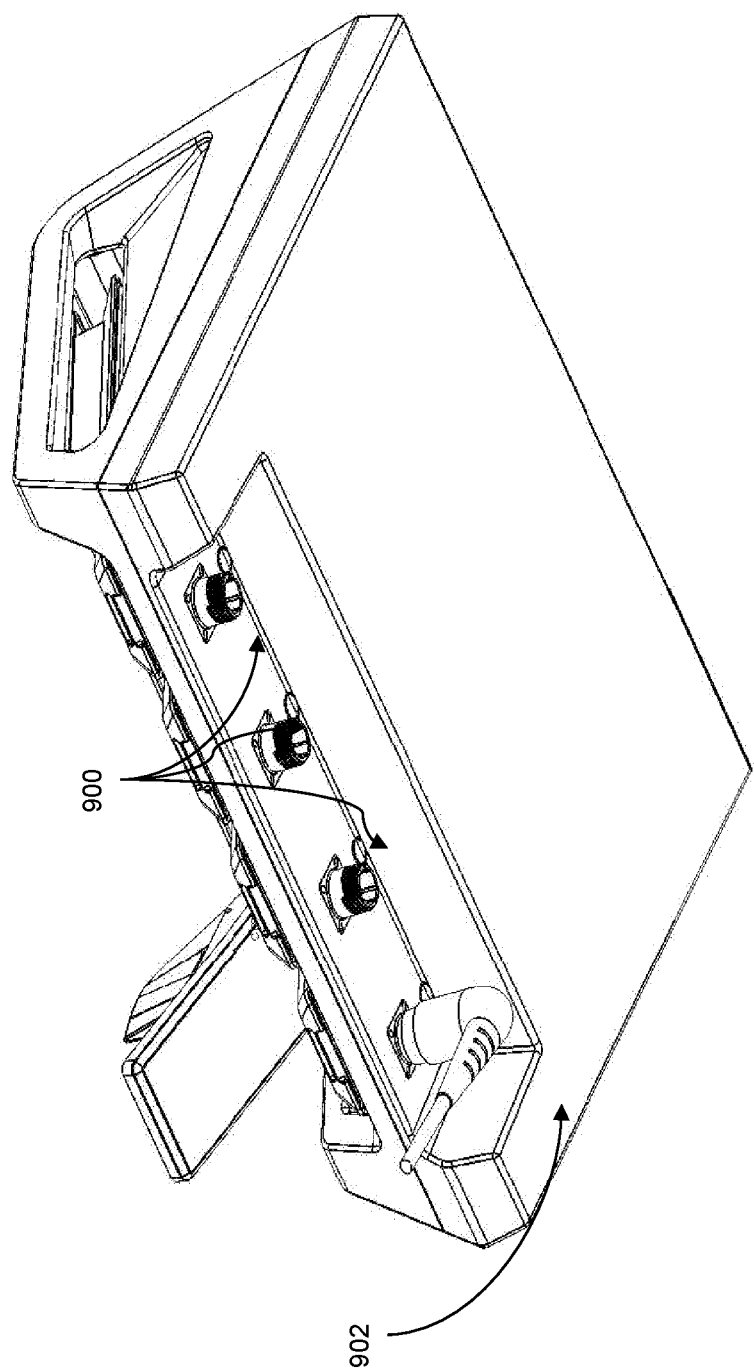
FIG. 9 illustrates an embodiment of external connectors and a corresponding mating connector, in accordance with embodiments of the present disclosure.

FIGS. 8A-I illustrate various views of embodiments of a launch box 800 and cassettes (802A and 802B) in storage (802B) and launch (802A) positions. The cassettes 802A illustrate a UAV 804 in a cradle 806, ready for launch. FIG. 9 illustrates an embodiment of external connectors 900 and a corresponding mating connector 902.

Figure 10:
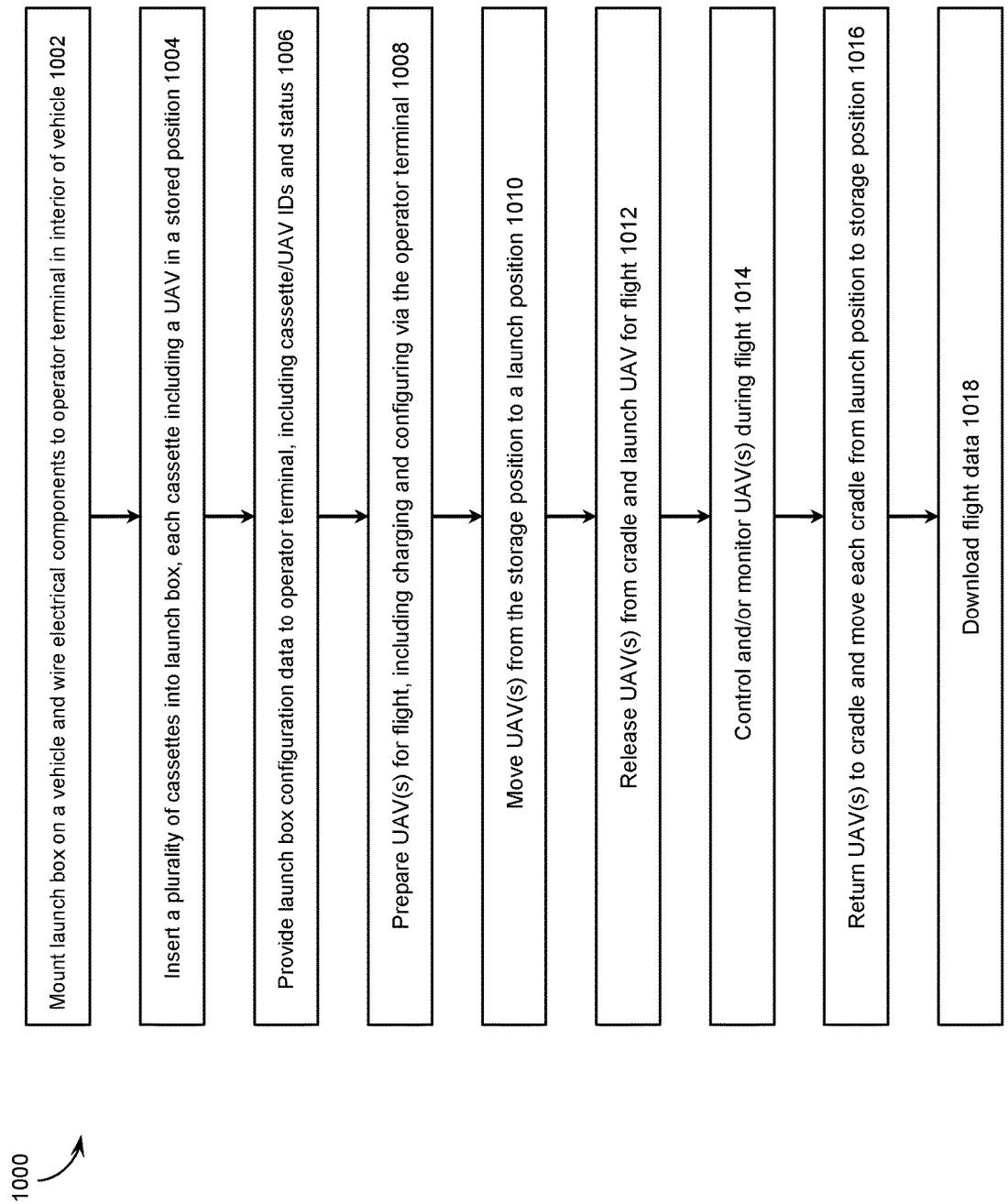
FIG. 10 illustrates a method for using a vehicle launch device, in accordance with one or more embodiments.

Referring to FIG. 10, a method 100 for using a vehicle launch device will now be described in accordance with one or more embodiments. In step 1002, a launch box is mounted on an exterior surface of a vehicle, such as the roof of a military vehicle. In some embodiments, the launch box is wired to receive power from the vehicle power supply and for communications with an operator terminal located on the interior of the vehicle. In step 1004, a plurality of cassettes are inserted into the launch box. Each cassette may include a UAV in a stored position. In some embodiments, the launch box may be adapted to hold 4-6 cassettes. When the cassettes are inserted, the UAV is electrically coupled to the launch box and the launch box may provide associted configuration data to the operator terminal in step 1006. The configuration data may include an identification of the cassettes and UAVs loaded into the launch box and a current status of the UAVs such as percentage charged and current flight plan. In step 1008, the operator terminal is used to prepare one or more UAVs for flight, including charging the UAV and configuring the UAV for its next mission.

In step 1010, the operator terminal (which is located on the interior of the vehicle) transmits instructions to the launch box to prepare one or more UAVs for launch, and the launch box instructs the launch mechanisms of the corresponding cassettes to move from the storage position to a launch position. In step 1012, one or more UAV(s) are released from the cradle and launched for flight as instructed by the operator terminal. During flight, the operator may control and/or monitor the UAV(s) using the operator terminal in step 1014. In step 1016, each UAV returns to the cradle and the launch box returns the UAV to the storage position for protection, charging and communication with the operator terminal. In step 1018, the UAV may download flight data and other acquired information to the operator terminal.

Referring to FIG. 11, an embodiment of a cassette 1100 securing a UAV 1102 with mechanical release assembly 1160 will now be described. In the illustrated embodiment, the mechanism release assembly 1160 is connected to the accuator assembly 1132 and is operable to release a spring to open the release arms 1124. For example, when the cradle 1122 passes a certain point a hook is operable to latch and release the spring.

In various embodiments, the launch box can be adapted for use with other UAV types, such as quadcopters. A quadcopter has larger footprint than a single rotor UAV and may be implemented in launch box design having fewer cassettes to accomodate the larger footprint. In one embodiment, the quadcopter is stored vertically in the storage position and held with the cradle and release mechanism holding the center of the quadcopter in place. Depending on the size of the quadcopter the dimensions of the cassette and lid would be bigger and in one embodiment, the actuator arm is adapted to position the quadcopter on the side of the arm. In some designs, the launch box would be bigger to accommodate the larger UAV and multiple cassettes in a row.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system for storing and launching aerial vehicles comprising:
   a housing having a plurality of recesses formed in the housing; and
   a plurality of removable cassettes, each cassette adapted to fit securely into one of the plurality of recesses and comprising:
      a cassette housing having a top portion with an opening formed in the top portion;
      a cradle adapted to hold an aerial vehicle; and
      an arm having a first end attached to the cradle and a second end rotatably coupled to the cassette housing, the arm operable to move the cradle between a storage position wherein the cradle is positioned inside the cassette housing, and a launch position wherein the arm extends through the opening, positioning the cradle outside of the cassette housing and enabling the aerial vehicle to launch.

2. The system of claim 1, wherein each cassette further comprises a release mechanism attached to the cradle and operable to hold the aerial vehicle on the cradle when the arm is in the storage position and release the aerial vehicle when the arm is in the launch position; and wherein the housing further comprises communications components operable to facilitate communications with an operator terminal, and wherein the release mechanism is adapted to open in response to an instruction received from the operator terminal, and wherein the cradle further comprises connectors for communicably coupling a cradled aerial vehicle with the operator terminal.

3. The system of claim 1, wherein each of the plurality of cassettes further comprises an actuator operable to move the arm between the storage position and the launch position.

4. The system of claim 1, wherein each of the plurality of cassettes further comprises a lid rotatably coupled to the top portion of the cassette housing and adapted to cover the opening in the storage position; wherein the cradle is connected to an interior portion of the lid and holds the lid open when in the launch position; wherein the cradle has charging points coupled to a power supply and is operable to charge the aerial vehicle when engaged with the cradle, and wherein the power supply comprises at least one of a battery and a vehicle power supply.

5. The system of claim 1, wherein each of the plurality of cassettes further comprises a first connector and wherein each of the plurality of recesses comprises a second connector adapted to mate with the first connector of a corresponding cassette inserted in the recess to form a connection, wherein the connection provides power, control and/or communications from the housing to the corresponding cassette inserted in the recess.

6. The system of claim 1, wherein the housing comprises weather proofing components comprising heating wires and/or a cooling fan; and wherein movement of the arm is adapted to break ice formed on a corresponding one of the plurality of cassettes.

7. A method for operating the system for storing and launching aerial vehicles of claim 1 comprising:
inserting a first of the plurality of cassettes in a first of the plurality of recesses;
positioning a first aerial vehicle on a first cradle of the first cassette; and
moving the first aerial vehicle between the storage position inside of the first cassette and the launch position outside of the housing along a first path that passes through the opening of the cassette.

8. The method of claim 7, further comprising mounting the housing to an exterior surface of a ground vehicle; receiving a command from an operator terminal positioned inside the ground vehicle and communicably coupled to the housing, to move the first aerial vehicle from the storage position to the launch position; and launching the first aerial vehicle in response to a command received from the operator terminal.

9. The method of claim 7 further comprising:
inserting a second cassette in a second of the plurality of recesses;
positioning a second aerial vehicle on a second cradle of the second cassette;
moving the second aerial vehicle between a second storage position inside the second cassette and a second launch position outside of the housing along a second path that passes through the opening of the second cassette; and selectively launching one of the first aerial vehicle and the second aerial vehicle.

10. A system for storing and launching a plurality of aerial vehicles comprising:
a launch device adapted for mounting on an exterior surface of a ground vehicle, the launch device comprising a launch mechanism operable to move an aerial vehicle between a storage position inside the launch device and a launch position outside the launch device; and
an operator terminal communicably coupled to the launch device and operable to control the launch mechanism;
wherein the launch device further comprises a plurality of launch mechanisms, each of the plurality of launch mechanisms independently operable to move a corresponding one of a plurality of aerial vehicles between the storage position inside the launch device and the launch position outside the launch device; and a plurality of cassettes, each of the plurality of cassettes adapted for insertion into the launch device; and wherein each of the plurality of cassettes houses a corresponding one of the plurality of launch mechanisms.

11. The system of claim 10, wherein the operator terminal comprises aerial vehicle flight controls and/or camera controls; and wherein the operator terminal is operable from an interior of the ground vehicle to transmit a command to the launch device to instruct the launch mechanism to move into the launch position.

12. The system of claim 10 wherein, in the storage position, the aerial vehicle is protected from environmental conditions and coupled to a power supply to facilitate charging; and wherein the launch mechanism comprises an actuator adapted to move the aerial vehicle from the storage position to the launch position.

13. The system of claim 10 wherein each of the plurality of cassettes further comprises a cassette connector adapted to mate with a corresponding launch device connector to provide power and communications between the launch device and each of the plurality of cassettes; and wherein the launch device further comprise electronics including control components operable to control operation of each of the plurality of cassettes inserted into the launch device.

14. The system of claim 10 wherein each of the plurality of cassettes further comprises a cradle adapted to hold one of the plurality of aerial vehicles, the cradle operable to charge a cradled aerial vehicle; wherein the cradle is slidably hinged to a lid along cradle slides; wherein the lid is hinged to a top of the corresponding cassette and, when the lid is in a closed position the lid covers an opening formed in the top of the corresponding cassette; wherein the launch mechanism is operable to rotate the cradle through the opening to open the lid which is aided by a spring that pushes up the lid; wherein the cradle is coupled to the corresponding cassette at a first hinge point; and wherein the launch mechanism comprises a lead screw step motor coupled to the corresponding cassette at a second hinge point, and a screw axel mounted to the corresponding cassette at a first end.

15. The system of claim 10, further comprising a release mechanism operable to hold a cradled aerial vehicle in a closed position and release the cradled aerial vehicle for launch in an open position; and a solenoid operable to selectively open and close the release mechanism.

16. A method for storing and launching aerial vehicles comprising:
storing a first aerial vehicle in a first storage position in a first enclosure of a launch device, wherein storing comprises:
cradling the first aerial vehicle in a first cassette by positioning the first aerial vehicle on a first cradle, and activating release arms on the first cradle to hold the first aerial vehicle on the first cradle, wherein the first cradle is coupled to the first cassette at a first hinge point, and coupled to an actuator assembly at a second hinge point;
inserting the first cassette into the first enclosure of the launch device;
electrically coupling the first aerial vehicle to the launch device; and
moving the first aerial vehicle into a first launch position by activating the actuator assembly to open a first lid of the first cassette and move the first aerial vehicle into the first launch position by pivoting the first cradle around the first hinge point, wherein the first aerial vehicle is positioned outside of the first enclosure of the launch device; and
deactivating the release arms on the first cradle to release the first aerial vehicle for flight.

17. The method of claim 16 further comprising mounting the launch device to an exterior surface of a vehicle; and receiving a command from an operator terminal positioned inside the vehicle to move the first aerial vehicle from the first storage position to the first launch position.

18. The method of claim 16 wherein storing the first aerial vehicle in the first storage position comprises positioning the first aerial vehicle on a first launch mechanism operable to move the first aerial vehicle between the first storage position and the first launch position; and wherein moving the first aerial vehicle into the first launch position comprises activating the first launch mechanism in response to a command received from an operator terminal communicably coupled to the launch device.

19. The method of claim 16, wherein the first cradle is slidably hinged to the first lid along at least one cradle slide;
wherein the first lid is hinged to a top of the first cassette; and
wherein when the first lid is in a closed position the first lid covers an opening formed in the first enclosure.

20. The method of claim 16, further comprising charging, through the first cradle, the first aerial vehicle.

* * * * *